(12) United States Patent
Price

(10) Patent No.: US 9,096,988 B2
(45) Date of Patent: Aug. 4, 2015

(54) PROSPECTING SHOVEL

(71) Applicant: Randy Price, Custer, SD (US)

(72) Inventor: Randy Price, Custer, SD (US)

( * ) Notice: Subject to any disclaimer, the term of this patent is extended or adjusted under 35 U.S.C. 154(b) by 0 days.

(21) Appl. No.: 13/964,212

(22) Filed: Aug. 12, 2013

(65) Prior Publication Data

US 2014/0070556 A1    Mar. 13, 2014

Related U.S. Application Data

(60) Provisional application No. 61/697,971, filed on Sep. 7, 2012.

(51) Int. Cl.
*A01B 1/04* (2006.01)
*E02F 3/02* (2006.01)
*A01B 1/02* (2006.01)
*A01B 1/22* (2006.01)

(52) U.S. Cl.
CPC ... *E02F 3/02* (2013.01); *A01B 1/02* (2013.01); *A01B 1/04* (2013.01); *A01B 1/22* (2013.01)

(58) Field of Classification Search
CPC .............. A01B 1/02; A01B 1/04; A01B 1/12; A01B 1/22; A01B 1/222; A01B 1/225; A47L 13/52; E02F 3/02
USPC ................. 294/49, 56, 59, 176, 181; 209/447; 15/257.1, 257.7, 257.9; 172/377
See application file for complete search history.

(56) References Cited

U.S. PATENT DOCUMENTS

| | | | |
|---|---|---|---|
| 41,771 A * | 3/1864 | Harold | |
| 341,175 A * | 5/1886 | Shaw | 15/257.7 |
| 457,271 A * | 8/1891 | Hall | 294/51 |
| 492,364 A * | 2/1893 | Powers | 172/372 |
| 594,778 A * | 11/1897 | Charles | 294/181 |
| 737,688 A * | 9/1903 | Wheeler | 15/257.9 |
| 1,201,505 A * | 10/1916 | Robson | 294/181 |
| 1,404,466 A * | 1/1922 | Miller | 15/257.1 |
| 1,493,766 A * | 5/1924 | Reimer | 294/49 |
| 2,823,470 A * | 2/1958 | Page | 37/265 |
| 3,863,237 A | 1/1975 | Doerr | |
| 3,868,775 A * | 3/1975 | Anderson | 30/329 |
| 4,190,279 A | 2/1980 | Sguazzin | |
| 4,828,690 A | 5/1989 | Montez | |
| 4,865,372 A * | 9/1989 | Gabriel | 294/49 |
| 5,367,737 A * | 11/1994 | Vosbikian et al. | 15/257.2 |
| 5,417,044 A | 5/1995 | Russo | |
| 5,662,366 A | 9/1997 | Fraske | |
| 8,006,474 B2 | 8/2011 | Baker | |
| 2003/0025344 A1 * | 2/2003 | Schultice et al. | 294/54.5 |

* cited by examiner

*Primary Examiner* — Dean Kramer

(74) *Attorney, Agent, or Firm* — Daniel Boudwin; Global Intellectual Property Agency LLC

(57) ABSTRACT

The present invention describes a prospecting tool in the form of a shovel. The prospecting shovel is designed to reduce the likelihood of sediment exiting the tool inadvertently during use. The device comprises a hand tool with an elongated handle and a bucket shaped working end adapted for scooping sediment from a creek. The bucket includes an open design having a leading end adapted for insertion into a creek floor and an internal ledge therein, whereby the ledge is configured to reduce the exiting of sediment from within the shovel. The design enables a user to scoop sediment from the bottom of a creek by performing a raking motion, whereby the leading end digs into the sediment and the ledge facilitates the retaining of minerals within the device.

5 Claims, 2 Drawing Sheets

PROSPECTING SHOVEL

CROSS REFERENCE TO RELATED APPLICATION

This application claims the benefit of U.S. Provisional Application No. 61/697,971 filed on Sep. 7, 2012, entitled "Bottom Digger." The above identified patent application is herein incorporated by reference in its entirety to provide continuity of disclosure.

BACKGROUND OF THE INVENTION

1. Field of the Invention

The present invention relates to a prospecting tool. More specifically, the invention relates to a tool adapted for scooping sediment from the bottom of a creek while searching for precious metals.

Gold is a precious metal that has held great value among a wide variety of cultures for many centuries. The metal is sought after because of its high malleability, ductility, conductivity, and resistance to corrosion. Because of these properties, gold has been used for jewelry, as a form of currency, and more recently has widespread uses in dentistry, electronics, and other fields. A search for gold has caused large numbers of people to move to new areas in search of new gold deposits, and in the process these gold rushes have led to new methods of gold discovery and extraction.

There have been a variety of methods developed in order to quickly mine areas that are known to contain profitable amounts of gold. These deposits of gold can be found in river beds and within mineral containing ores. The methods include that of panning, placer mining, sluicing, dredging, and hard rock mining for gold.

As discovery processes have evolved, gold prospectors have developed new techniques for mining for gold and other minerals. Small scale prospectors typically prospect for placer gold, wherein a placer deposit contains an accumulation of valuable minerals formed by gravity separation during sedimentary processes. The miners use a variety of methods extract and separate gold from other non-desired minerals. The most popular method of gold separation is by gold panning, wherein a portion of a placer deposit is scooped into a pan. The deposit is gently agitated in water causing the gold to sink to the bottom of the pan. The setback of panning is that while some of the desired minerals may fall to the bottom during the agitation process, others precious minerals may accidently be removed or discarded, causing the prospector to miss out on a valuable find. Moreover, the method of panning requires a user to bend over to extract the sediment. This method often proves difficult for those who have back issues, and may often cause back problems for healthy users after extended panning.

There are several devices that attempt to provide a means of separation of sediment without requiring a user to bend over. These devices are provided in the form of prospecting shovels that rake across the ground and generally include a filtering mechanism for separating minerals from the water. The drawbacks of these devices are that they are often fail to provide attachments on the end of the shoveling devices that are adapted for traversing denser sediment. Additionally, since these devices include filtering mechanism adapted for water to flow out of the device, some trace amounts of desirable minerals may not remain in the device when the user searches contents thereof.

The present invention relates to a prospecting shovel that is capable of removing a portion of sediment from a creek. The prospecting shovel has an elongated handle and a shovel working end, wherein the shovel working end comprises a bucket-shaped shovel having an open upper, a closed and curving base, upstanding sidewalls, an internal ledge, and a leading end. The leading end of the shovel is adapted for insertion into a layer of sediment and provides a sharpened implement that can be replaced after extended use. The device differs from that of known shovel tools in that it prevents sediment captured within its bucket interior from easily exiting the same during the retrieval and sediment inspection process. The present invention serves to enable removing of sediment from the bottom of a creek, whereby the sediment is scooped into the bucket interior in a backward raking motion in order to facilitate the recovery of gold and other precious metals without bending over or losing large amounts of collected sediment during the process.

2. Description of the Prior Art

Devices have been disclosed in the prior art that relate to prospecting shovels. These include devices that have been patented and published in patent application publications. These devices generally relate to digging tools having entrapment meshes. The following is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 3,863,237 to Doerr discloses a lake raking apparatus adapted for removing stones, weeds, debris and the like from the bottom of ponds and lakes. The raking apparatus includes a rigid box-like structure with one open side and a handle attached to one edge of the open side and a rigid cutting edge attached to the edge of the open side opposite the handle. The configuration has rigidity, good strength and insures that the handle and the box-like structure remain at a fixed angular configuration. Although the raking apparatus of Doerr is similar in nature and relevant to the present invention, it differs in that it fails to provide an open bucket design having upstanding sidewalls and a closed and arcuate base, wherein the sidewalls and base lack apertures that facilitate the filtering of sediment from the bucket of the shovel and further lacks a pointed end to facilitate the movement through the sediment.

U.S. Pat. No. 4,190,279 to Sguazzin teaches a clam rake adapted to rake up clams and other delicacies such as scallops and oysters who inhabit the sand and mud of shallow waters. The clam rake includes side skids having raking teeth extending downward, therefore preventing clams from escaping from the basket through the sand. However, while the clam rake of Sguazzin is similar in nature and relevant to the present invention, it differs in that it fails to provide an open bucket design including up standing sidewalls and an arcuate and closed base that lack apertures or openings that permit the filtering of sediment or water through the bucket.

U.S. Pat. No. 4,822,090 to Kim discloses a shovel for placer mining for use in a riverbed. The shovel includes a shovel handle, a shovel blade fixed to the handle, a shovel scoop detachably screwed underneath the blade, a mesh screen underneath the shovel blade, and a bottom lining. While the shovel of Kim is relevant in nature and similar to the present invention, it differs in that it fails to provide a pointed leading end adapted for facilitating shoveling into sediment.

U.S. Pat. No. 4,828,690 to Montez teaches a hand tool for sifting debris from sand and soil. The tool includes a tapered wedge head, an entrapment mesh supported by a carriage structure, and a handle adjustably coupled to the carriage structure. However, while the sand sifting tool of Montez is similar in nature and relevant to the present invention, it differs in that it fails to provide an open bucket design having a upstanding sidewalls and a closed and curved base lacking apertures to facilitate the removal of sediment and creek water through the back and sides of the shovel.

U.S. Pat. No. 5,417,044 to Russo describes a horse mucking rake. The rake includes a substantially straight, elongated handle, a base frame, a cage, and a plurality of tines. The tines extend from the base frame at right angles and each of the tines are parallel to each other. The cage comprises a lattice structure wherein the width of the lattice is less than the width between the tines. Although the mucking rake of Russo is similar in nature and relevant to the present invention, it differs in that it fails to provide an open bucket design having a upstanding sidewalls and a closed and arcuate base lacking apertures that facilitate the removal of sediment and creek water through the back and sides of the shovel.

U.S. Pat. No. 5,662,366 to Fraske teaches a golf ball retriever. The retriever includes a main body resembling a scoop with a handle holder to which a pole-like handle may be attached. The main body includes a flat top portion arcuately connected to a flat bottom portion having a leading edge extending along the length thereof. The main body further includes three slots that are adapted to retain golf balls while allowing water to pass through the scoop. However, while the golf ball retriever or Fraske is similar in nature and relevant to the present invention, it differs in that it fails to provide an open bucket design having a raised back wall and side walls that lack apertures that facilitate the removal of sediment and creek water through the back and sides of the shovel, or a pointed leading end configured for insertion through sediment.

Finally, U.S. Pat. No. 8,006,474 to Baker describes a pond cleaning device. The device includes an open frame, a mesh net, a telescoping handle, and a plurality of tines extending from the frame. Although the pond cleaning device of Baker is similar in nature and relevant to the present invention, it differs in that it fails to provide an open shovel design having a raised back wall and side walls that lack apertures that facilitate the removal of sediment and creek water through the back and sides of the shovel.

The present invention relates to a new and improved prospecting shovel that reduces the loss of sediment while obtaining a sediment sample. The prospecting shovel includes an elongated handle and a bucket-shaped working end. The working end can be made from aluminum, steel, or another suitable material and includes a handle attachment area to accommodate an elongated user handle. The working end is a bucket-shaped implement having an open upper, raised sidewalls and an arcuate base that forms extends to form the back wall. Within the bucket interior is an internal ledge, while the bucket leading end includes a replaceable sharpened implement for piercing the sediment surface. The sharpened implement includes a pair of teeth that are removably secured to the leading end of the shovel.

Overall, the present invention provides a prospecting shovel that comprises an open bucket design having an open upper portion and a closed and arcuate base that lacks apertures therealong, which facilitates a reduction in lost product when prospecting through sediment. The bucket includes an internal ledge adapted to restrict the advancement of sediment towards the leading edge of the bucket while raking sediment into the shovel or when lifting and removing a sample of sediment from the ground.

In view of the aforementioned failings of the prior art devices, it is shown that the prior art has several known drawbacks that the present invention intends to solve. It is submitted that the present invention is substantially divergent in design elements from the prior art, and consequently it is clear that there is a need in the art for an improvement to existing prospecting shovel devices. In this regard the instant invention substantially fulfills these needs.

SUMMARY OF THE INVENTION

In view of the foregoing disadvantages inherent in the known types of prospecting shovels now present in the prior art, the present invention provides a new prospecting shovel wherein the same can be utilized for providing convenience for the user when retaining sediment within the device for inspection and retrieval of articles therein.

The prospecting shovel device of the present invention is designed for those who desire to have an opportunity to analyze a more complete sampling of sediment that has been contained within the shovel. Moreover, the device also has a leading end having a ground-breaking design that facilitates the movement of the shovel through harder soil or similarly dense ground surfaces.

It is therefore an object of the present invention to provide a new and improved prospecting shovel device that has all of the advantages of the prior art and none of the disadvantages.

It is another object of the present invention to provide a prospecting shovel comprising a working end having an arcuate base and upstanding sidewalls, whereby the base and sidewalls retain sediment and creek water therein for retrieval and inspection.

Another object of the present invention is to provide a prospecting shovel comprising a ledge within the interior of the device, whereby the ledge prevents loss of sediment during the retrieval process.

Yet another object of the present invention is to provide a prospecting shovel including a sharpened leading edge, whereby the leading edge is adapted for insertion into a ground surface or creek bed.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
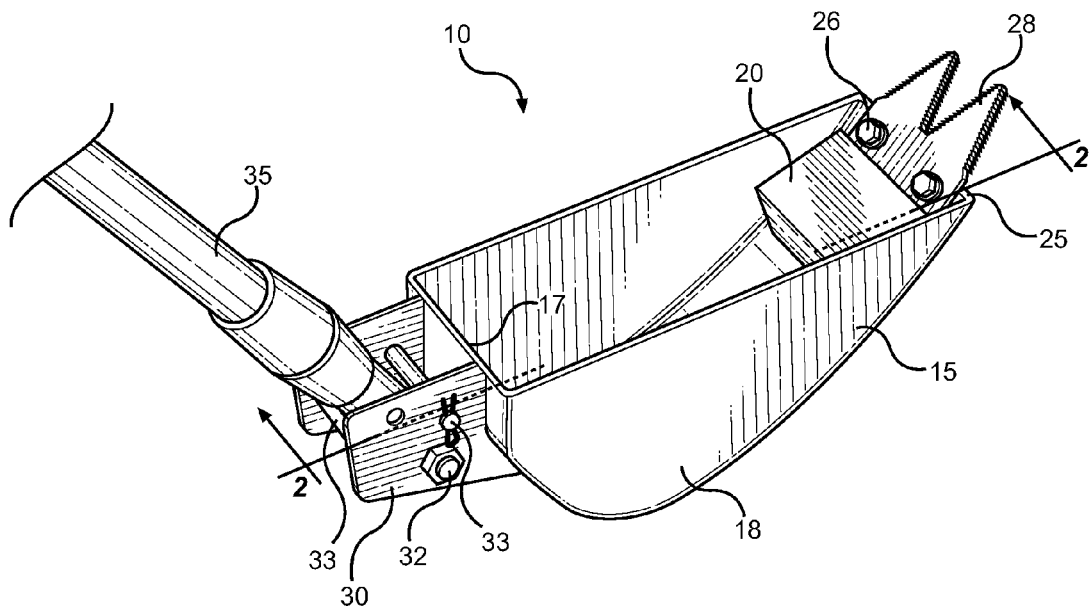
FIG. 1 illustrates a perspective view of the preferred embodiment of the prospecting shovel of the present invention.

Reference is made herein to the attached drawings. Like reference numerals are used throughout the drawings to depict like or similar elements of the prospecting shovel of the present invention. For the purposes of presenting a brief and clear description of the present invention, the preferred embodiment will be discussed as used for prospecting in a creek or other similar shallow water surface. The figures are intended for representative purposes only and should not be considered to be limiting in any respect.

Figure 2:
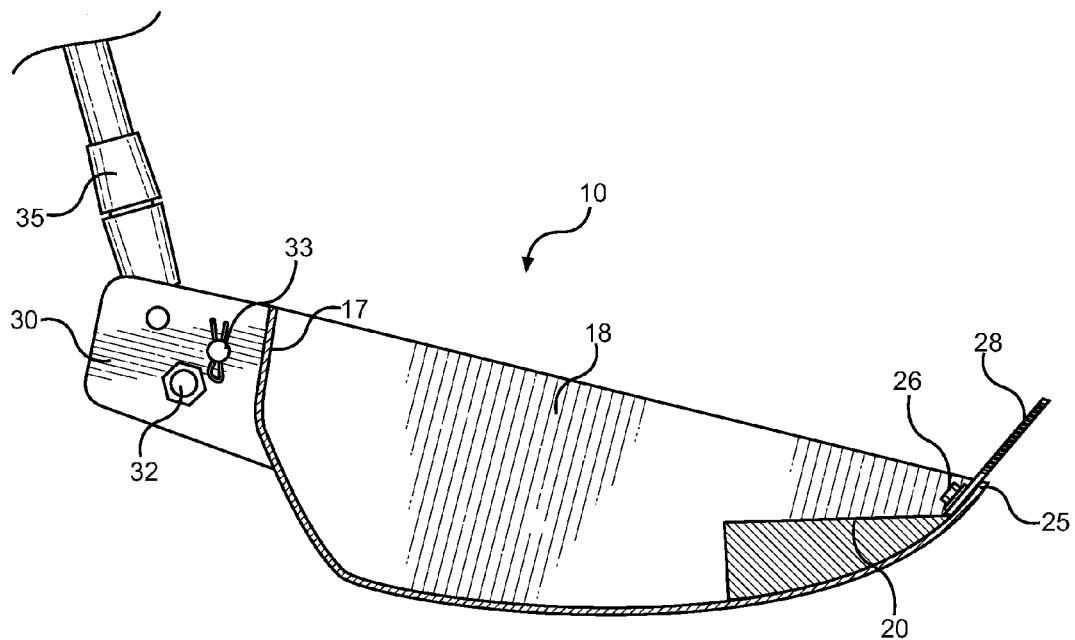
FIG. 2 illustrates a cross-section side view of the preferred embodiment of the present invention.

Referring now to FIGS. 1 and 2, there are shown views of the preferred embodiment of the prospecting shovel of the present invention. The prospecting shovel is configured to scoop sediment from the bottom of a creek bed or similar low water level area while searching for gold or other similar precious metals. The prospecting shovel includes a shovel working end 10 having a bucket shape that is connected to a handle 35. The bucket shaped end 10 includes an arcuate base that extends into a back section 17, forming an interior volume with an open upper and bounded by upstanding sidewalls 18.

The shape of the base 17 and sidewalls 18 of the bucket 10 facilitate the retaining of any sediment and water within the bucket 10 interior until removed at a later time by a user. Furthermore, the design of the shovel prevents any undesired loss of sediment from the bucket 10 that might occur when retrieving sediment during use and while inspecting the contents of the sediment within the bucket interior.

The bucket 10 also comprises an internal ledge 20 that restricts the movement of the contents within the bucket 10. The ledge 20 resides within the bucket 10 and extends diagonally downward from the leading edge 25 of the bucket. When the bucket 10 is tilted or used in a manner that might encourage the movement of the contents towards the leading edge 25, the ledge 20 is adapted to restrict the movement of the water and sediment.

The leading edge 25 includes a removable tip 28 which facilitates the movement of the bucket 10 through the sediment. The removable tip 28 preferably comprises dual, triangular-shaped sides positioned adjacent to each other, and further includes serrations in the form of teeth along the edges of the removable tip 28. The removable tip 28 is made from hardened material, whereby the tip can be utilized for an extended period of time and thereafter removed to provide an extended life for the bucket 10. This is particularly true when digging in locations that include tough bedrock. In a preferred embodiment, the tip 28 can be removably attached by a fastening means 26, which enables the tip 28 to be replaced and removed as it wears down over time.

The elongated handle 35 is removably attached to the bucket 10 by a holder 30 therefor, whereby the holder 30 preferably extends from the exterior of the arcuate and closed base 17. Any common means of removably attaching a handle is contemplated by the present invention; however in the preferred embodiment, the holder 30 includes a bolt 32 and pair of pins 33. The bolt 32 removably secures the handle 35 to the holder 30 and the pair of pins 33 limits the degree of pivoting of the handle 35 about the bolt 33. Movement of the bucket 10 relative to the handle when filled with sediment is undesirable because movements have the potential to cause the spillage of contents from bucket 10, thus opening the possibly of lost precious minerals otherwise corralled.

Figure 3:
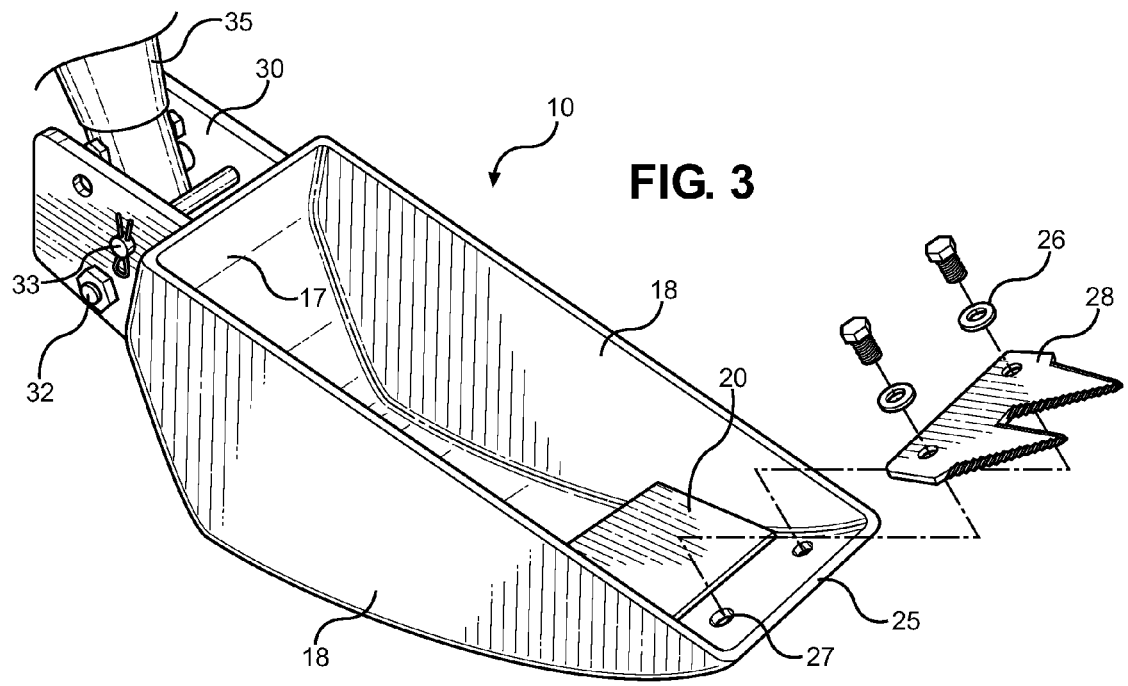
FIG. 3 illustrates a view showing the detachability of the leading edge of the preferred embodiment of the present invention.

Referring now to FIG. 3, there is shown an illustration of the detachability of the removable tip 28 from the leading edge 25 of the bucket 10. The prospecting shovel includes a bucket shaped working end 10 having a holder 30 and a handle 35. The holder 30 is attached to the exterior of the base 17, wherein the base 17 extends to a back portion of the bucket 10 and provides a removable connection for the handle 35 onto the working end 10 by way of a bolt 32 and a pair of pins 33 through the holder 30.

The prospecting shovel is configured for scooping sediment from a creek; however, the repeated use of the prospecting shovel in areas that contain bedrock might result in the deterioration of the removable tip 28. To repair the bucket 10, the tip 28 is configured to be removable. The removable tip 28 comprises apertures that align with apertures 27 of the leading edge 25 of the bucket 10. A fastener 26 is inserted through the aligned apertures 27 of the removable tip 28 and the leading edge 25 to seal the tip 28 onto the bucket 10. When a new tip 28 is needed, the fasteners 26 are removed from the apertures 27 of the removable tip 28 and a new tip 28 replaces the worn one.

Figure 4:
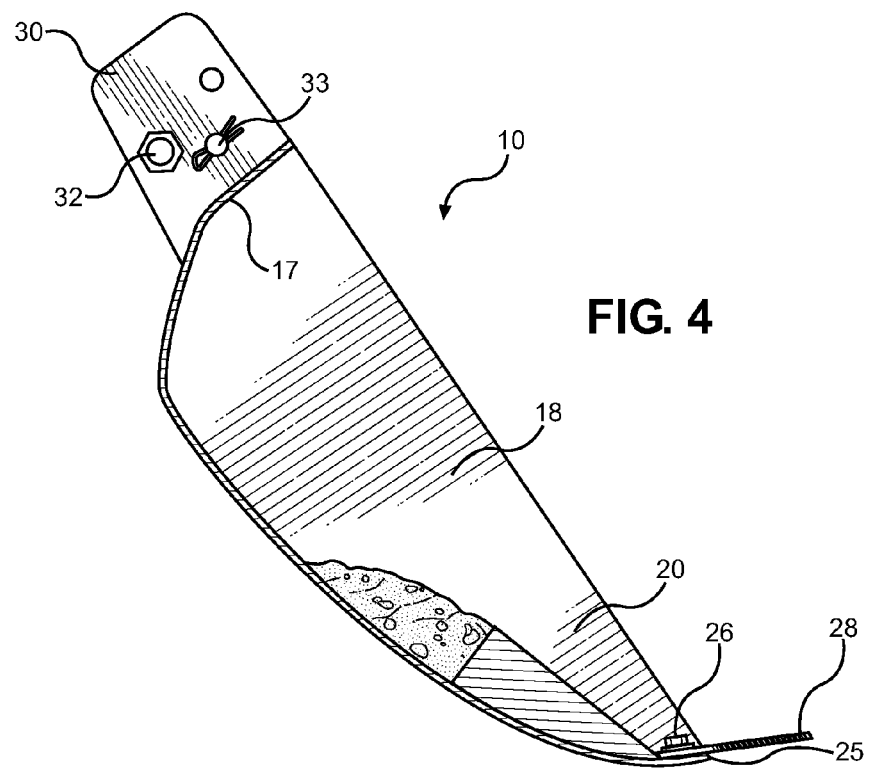
FIG. 4 illustrates another cross-sectional side view of the preferred embodiment of the present invention, including sediment within the bucket.

Referring now to FIG. 4, there is shown the bucket 10 of the present invention in use. The removable tip 28 is adapted for insertion in to a creek bed or similar shallow body of water in order to obtain sediment samples. Unlike traditional prospecting shovels, the present invention comprises a bucket shaped working end 10 having an arcuate base 17, upstanding sidewalls 18, an internal ledge 20, and a removable tip 28 attached at a leading edge 25, whereby the present invention differs from the prior art in that the side and base walls lack apertures for the filtration of sediment and water through the device. The bucket 10 facilitates the capture of the entire sediment sample for further observation at a later time. This is further accomplished by an internal ledge 20 that acts as a wall that blocks the removal of sediment and water samples within the prospecting shovel.

In use, a user performs a raking-type motion of the prospecting shovel towards the user by extending the bucket 10 outward and pulling the back toward the user, whereby the removable tip 28 is pointed downward in order to be the first element to enter the sediment. The teeth of the tip 28 disrupt the sediment and facilitate the movement of the sediment into the bucket shaped working end 10. The sediment is moved within the bucket 10 and is moved over the ledge 20, whereby the ledge 20 creates a barrier that restricts the removal of the sediment over the ledge 20 and out of the leading edge 25 section of the bucket 10. Moreover, the arcuate and closed base 17 and upstanding sidewalls 18 lack apertures or similar openings that facilitate filtering of sediment and/or creek water, thereby preserving a complete sediment sample within the bucket 10 of the prospecting shovel. When a desired amount of sediment sample is collected within the prospecting shovel, the bucket 10 is turned over to facilitate the dumping of the sediment into a receptacle adapted for providing a surface for examining the sediment for precious metals. Alternatively, sediment examination may occur within the bucket 10 of the prospecting shovel.

The present invention provides an improved prospecting shovel configured for scooping sediment from the bed of a creek, whereby the shovel is adapted for the capturing and retaining of precious metals and gems. The present invention comprises a bucket shaped working end 10 and a removable handle 35. The bucket 10 includes an arcuate and closed base 17, upstanding sidewalls 18, a ledge 20, a leading edge 25, and a removable tip 28, whereby the tip 28 is attached to the leading edge 25. The removable tip 28 of the bucket 10 facilitates the movement of the bucket 10 through the sediment of a creek. The tip 28 includes two pointed-triangle shaped sides made of hardened steel which are located adjacent to each other in a bifurcated manner, whereby the steel ends enable the bucket 10 to enter areas that contain tough bedrock. Moreover, in the preferred embodiment, the removable tip 28 can be attached by a fastening means 26, which enables the tip 28 to be replaced and removed as is wears down over time.

Additionally, the bucket 10 includes an arcuate and closed base 17 and upstanding sidewalls 18, whereby the walls lack apertures or other mechanisms that facilitate the removal of sediment therefrom. The base 10 further comprises an internal ledge 20 that works as an additional blocking mechanism that prevents the removal of sediment and liquids from the bucket 15, whereby the ledge 20 restricts sediment from removal from the bucket 10 during inadvertent movements by the user. The ledge 20 is attached within the bucket 10 and extends diagonally downward therefrom, whereby movements that might encourage the flow of sediment to an area outside of the bucket 10 are prevent by the ledge 20 acting as a wall.

The handle 35 is also configured to be removable in the event that the handle becomes broken or otherwise damage while digging through tough sediment such as bedrock. The elongated handle 35 is removably attached to the bucket 10 by a holder 30 that is welded to the exterior of the bucket 10. The holder includes a bolt 32 and a pair of retaining pins 33, whereby the bolt removably secures the handle 35 and the pins 33 act to prevent any unwanted pivoting of the handle 35 about the holder 30. Such movements are undesirable because shifts within the bucket 10 caused by a loose handle 35 might result in the loss of sediment containing precious minerals.

The present invention is designed for those who desire to have a prospecting shovel that prevents the loss of precious minerals that might otherwise be lost while using mesh back prospecting shovels. The device is of an open design and comprises a tough removable tip 28 that facilitates the movement of the shovel through the bed of a creek or similar shallow body of water. In this way, the present invention provides a dredging tool that enables a user to scoop and retain sediment from the bottom of a creek.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A prospecting shovel, comprising:
   a bucket working end having upstanding sidewalls, a closed and arcuate base, an open upper portion, and an interior volume, wherein said upstanding sidewalls have upper parallel edges;
   said bucket further comprising a leading edge having an internal ledge within said interior volume;
   said internal ledge comprising an upper surface that is substantially perpendicular to a lateral surface;
   said upper surface of said internal ledge spanning between opposing sidewalls of said bucket and ending short of said leading edge;
   said upper surface of said internal ledge extending diagonally downward from said leading edge relative to said upper parallel edges of said upstanding sidewalls;
   said lateral surface connecting to opposing sidewalls of said bucket and said base, whereby said lateral surface of said internal ledge is adapted to prevent sediment from freely exiting said bucket from said leading edge;
   a handle holder attached to the exterior of said base of said bucket;
   a handle attached to said handle holder.

2. The prospecting shovel of claim 1, further comprising a removable tip removably attached to said leading edge, whereby said tip is adapted for ground penetration.

3. The prospecting shovel of claim 2, wherein said tip further comprises a bifurcated and triangular-shape.

4. The prospecting shovel of claim 3, wherein said tip further comprises serrated edges.

5. The prospecting shovel of claim 1, wherein said handle is removably attached to said handle holder whereby said handle is attachable through a bolt and pins through said holder, whereby said bolt is inserted through said handle holder and said handle, and further wherein said pins are configured to restrict rotational movement of said handle with respect to said bolt.

* * * * *